United States Patent [19]

Yamaguchi

[11] Patent Number: 5,689,488
[45] Date of Patent: Nov. 18, 1997

[54] OPTICAL DISC SYSTEM, OPTICAL DISC AND RECORDING METHOD

[75] Inventor: Shigeo Yamaguchi, Kanagawa, Japan

[73] Assignee: Sony Corporation, Tokyo, Japan

[21] Appl. No.: 797,035

[22] Filed: Feb. 10, 1997

[30] Foreign Application Priority Data

Feb. 28, 1996 [JP] Japan .................. 8-067164

[51] Int. Cl.$^6$ ..................................... G11B 5/09
[52] U.S. Cl. ..................... 369/59; 369/48; 369/275.3
[58] Field of Search ..................... 369/59, 48, 275.3, 369/275.2, 47, 54, 58

[56] References Cited

U.S. PATENT DOCUMENTS

| | | | |
|---|---|---|---|
| 4,748,611 | 5/1988 | Tsuyoshi et al. | 369/59 |
| 5,278,815 | 1/1994 | Mashimo et al. | 369/48 |
| 5,623,477 | 4/1997 | Shimada et al. | 369/275.3 |

FOREIGN PATENT DOCUMENTS 6-162590  6/1994  Japan .

*Primary Examiner*—Tan Dinh
*Attorney, Agent, or Firm*—Limbach & Limbach L.L.P

[57] ABSTRACT

An optical disc system, optical disc, and a recording method allow users to use increased data recording capacities on recording media. The optical disc system for recording data modulated according to a predetermined encoding restrictive length on an optical disc comprises switching means for selectively outputting synchronization control data composed of patterns having a period shorter than the encoding restrictive length and used for synchronization at a data readout time, or the recording data at predetermined time intervals. A recording area for the synchronization control data can be narrowed in a sector format by generating the synchronization control data and recording it on a medium as patterns having a period shorter than that of patterns modulated according to the predetermined encoding restrictive length.

6 Claims, 5 Drawing Sheets

OPTICAL DISC SYSTEM, OPTICAL DISC AND RECORDING METHOD

BACKGROUND OF THE INVENTION

1. Field of the Invention

This invention relates to an optical disc system, an optical disc and a recording method, and more particularly, is preferable to record data, for example, modulated at a predetermined encoding restrictive length, on a recording medium.

2. Description of the Related Art

On a conventional optical disc, bit patterns referred to as variable frequency oscillators (VFOs) are recorded in a format, for example, represented by the format which is referred to as continuous servo tracking mode. The VFO patterns are repetitive patterns which consist of bit patterns repeated for at least in a definite number of cycles.

FIG. 1 shows, as an example of the sector format of a magneto-optical disc, the sector format having 1,024 bytes per sector of a 5.25-inch quadruple density magneto-optical disc. The sector format is roughly divided into a header section consisting of an address section A, an auto laser power control (ALPC) and gap section B, data section C and a recording section consisting of a buffer section D.

The address section A indicates an address at which the sector physically exists on the optical disc and is preliminarily recorded for each sector at formatting stage of the optical disc.

The address section A starts with a bit pattern referred to as a sector mark (SM) which indicates a head of a sector. Then, address data patterns consisting of a combination of a variable frequency oscillator ($VFO_1$) which is control data to be used as a servo for rotation of a disc, an address mark (AM) which indicates a start position of address data, and an identifier ($ID_1$) which indicates a track number and a sector number are repeated several times. In FIG. 1, first patterns consisting of $VFO_1$ through $ID_1$ and second patterns consisting of $VFO_2$ through $ID_2$ are recorded. The address data patterns can be read out without fail by repeatedly recording the same patterns a plurality of times. Finally, a postamble (PA) is recorded to indicate completion of the address section A.

After $VFO_2$ and $VFO_2$ are read out of the optical disc, they are input into a phase locked loop (PLL) circuit in the optical disc system. The PLL circuit generates a channel clock signal on the basis of a cycle of the bit patterns composing $VFO_1$ and $VFO_2$. The optical disc system extracts data from signals reproduced from the optical disc in synchronization with rotation of the optical disc which is regenerated with the channel clock signal. Even when the rotation of the optical disc varies, the data can be read out without fail by regenerating the optical disc on the basis of the channel clock signal generated with the VFO since timing of the VFO varies simultaneously with the variation of the rotation.

The ALPC and gap section B are used for recording a flag which indicates a data condition in the sector, and indicates whether the sector is a recorded block, a defective block or a deleted block. Further, an auto laser power control (ALPC) and so on are recorded as test bit patterns for adjusting a power level of a laser beam for irradiating the optical disc.

The data section C is an area in which data is actually recorded by users, and a cyclic redundancy check (CRC) bit which is used for detecting error correction in reading out recorded data, RESYNC consisting of code patterns for synchronization, etc. are recorded together with user data in this section. $VFO_3$ is recorded as a VFO pattern in the data section C. Data can be read out without fail by using a channel clock signal generated on the basis of the $VFO_3$ for reading out the data.

Finally, the buffer section D is recorded for allowing each sector to have a marginal length which prevents a data section C from being close to or coincident with a terminal end of the sector. Accordingly, data cannot be overlapped with an address even when recording locations of data are slightly deviated due to rotational jitter, etc. at a recording time.

Data can be read out without fail when data is recorded on a magneto-optical disc in the sector format described above.

All signals are recorded on the optical disc after they are modulated in a predetermined modulation mode. In a modulation mode which uses the run length limited (RLL) (1, 7) and the non return to zero inverted (NRZI) adopted for a 2.6 Gbytes magneto-optical disc, for example, encoding modulation is performed according to a rule that one to seven bits represented by "0" may be successive and a signal level is inverted at a location of a bit represented by "1".

Speaking concretely of VFO patterns shown in FIG. 2, for example, one cycle consists of four channel clocks "1100" and this cycle is repeated in a predetermined number of times. In a bit string consisting of "1100" within a cycle, a signal rises at the first "1" and falls at the next "1". At the subsequent "00", a cycle completes with no change of signal on or off. A signal rises again at a first "1" in the next cycle. By such modulation, a bit pattern consisting of eight bits, for example, is converted into a bit pattern consisting of twelve bits.

In the sector format of the optical disc having the configuration described above, recorded data can be reproduced stably or independently of rotational variations of the optical disc since channel clock signals are generated by the optical disc system on the basis of the VFOs recorded on the optical disc and data is extracted from the signals reproduced from the optical disc on the basis of the channel clock signals or in synchronization with the rotation of the optical disc.

Further, signals to be recorded on the optical disc are modulated according to a predetermined encoding restrictive length, and VFOs are also modulated similarly according to a predetermined encoding restrictive length and then recorded.

However, the modulation according to the predetermined encoding restrictive length increases redundancy in an optical disc system and an optical disc which have a main object of data recording, thereby posing a problem that the modulation narrows data recording capacity which can be used by user on an optical disc.

SUMMARY OF THE INVENTION

In view of the foregoing, an object of this invention is to provide an optical disc system, an optical disc and a recording method which allow users to utilize increased data recording capacities on a recording medium.

The foregoing object and other objects of the invention have been achieved by the provision of an optical disc system for recording data modulated according to a predetermined encoding restrictive length on an optical disc, the optical disc system comprises switching means for selectively outputting synchronization control data which consists of patterns having a period shorter than the encoding restrictive length and is used for synchronization at a data readout time or recording data at a predetermined time intervals.

It is possible to narrow an area for recording synchronization control data in a sector format by generating the synchronization control data as patterns having a period shorter than that of the patterns modulated according to a predetermined encoding restrictive length and recording the data on a medium. The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Overall Configuration

Figure 2:
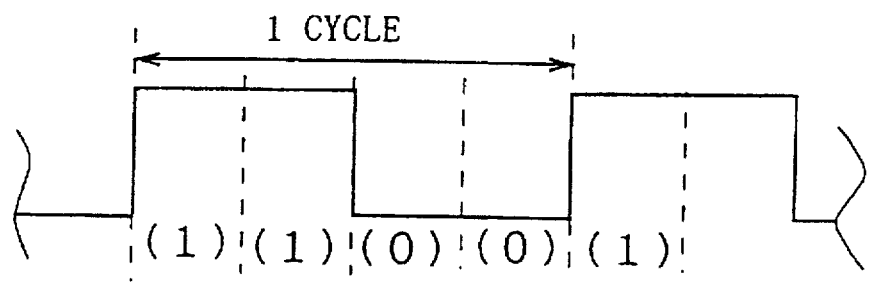
FIG. 2 is a pattern diagram showing patterns composing the conventional VFO signal.
Figure 3:
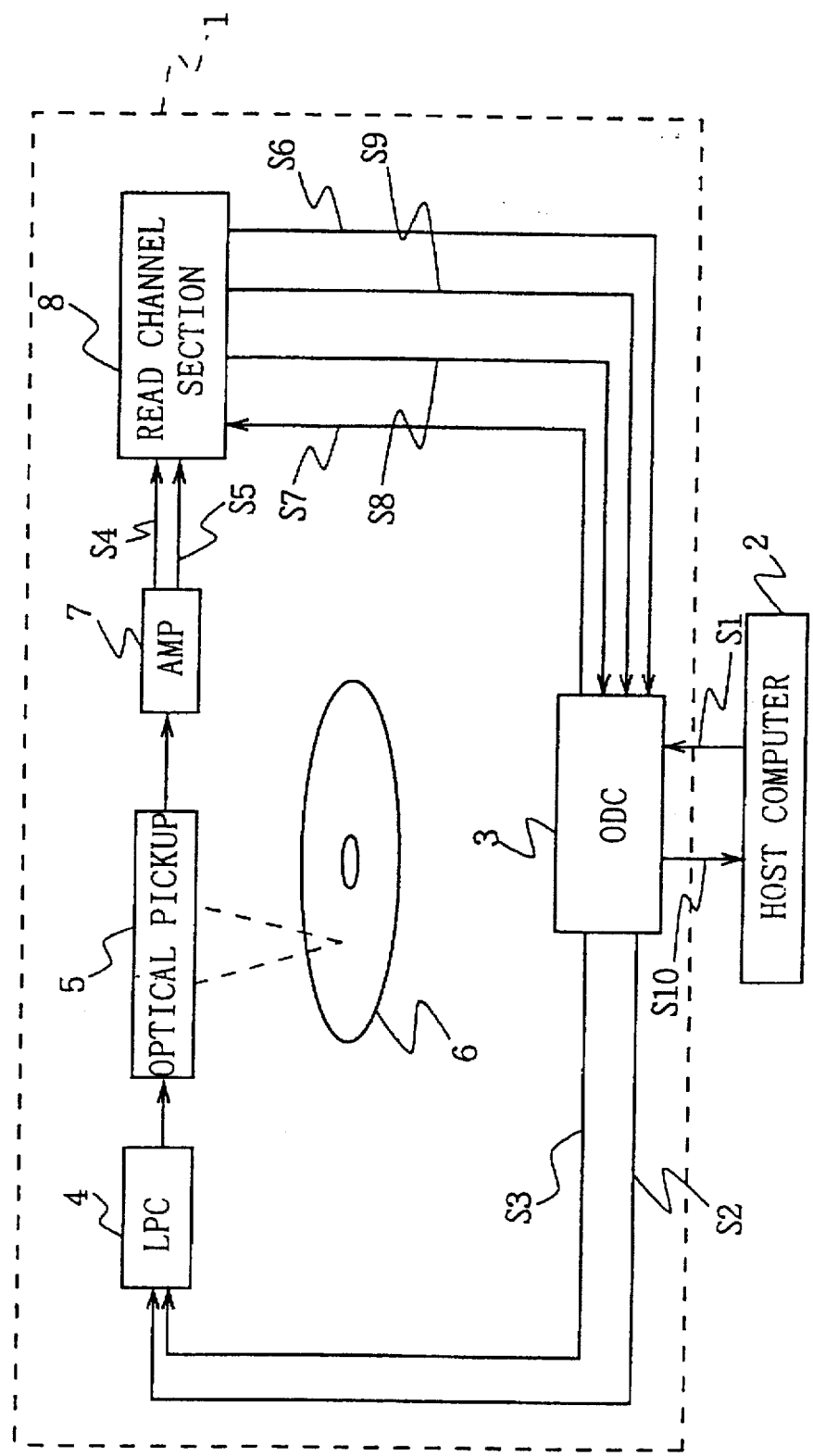
FIG. 3 is a block diagram showing an overall configuration of the optical disc system according to the present invention.

In FIG. 3, a reference numeral 1 represents an overall configuration of an optical disc system which is composed of two systems: a recording system circuit and a reproducing system circuit. The optical disc system 1 is configured to generate, in the recording system circuit, VFO signals consisting of patterns which have a period shorter than that of the patterns generated according to a conventional encoding restrictive length shown in FIG. 2 and record these signals on an optical disc.

In recording data, the optical disc system 1 inputs a data signal S1 given from a host computer 2 to an optical disc controller (ODC) 3. The ODC 3 modulates the data signal S1 in a predetermined modulation mode, generates a VFO signal, adds the VFO signal to the modulated data signal S1 so as to generate a recording data signal S2 and supplies this signal together with a control signal S3 to a laser power controller (LPC) 4. Though the data signal S1 is modulated in an RLL(1,7) and NRZI mode, the VFO signal is generated as patterns shorter than the patterns encoded in this modulation mode.

The LPC 4 outputs a recording data signal S2 to an optical pickup 5, and controls the optical pickup 5 on the basis of the recording data signal S2 and the control signal S3, thereby controlling an intensity of a laser beam which is emitted from the optical pickup 5 for irradiating an optical disc 6. The recording data signal S2 is recorded on the optical disc 6 with the optical pickup 5 thus controlled.

The ODC 3 of the optical disc system 1 is connected to the host computer 2 through a bus (not shown) and, in reproduction of data, a command designating reproduction is input from the host computer 2 to the ODC 3 through the bus. In correspondence to this command, the ODC 3 sends a control signal S3 to the LPC 4 for allowing the optical pickup 5 to emit a laser beam to the optical disc 6 while controlling the intensity of the laser beam. The optical pickup 5 reads out a signal recorded on the optical disc 6 while receiving a reflection light of the irradiating laser beam. Outputs of a detector, for example, a detector divided into four, are supplied from the optical pickup 5 to an amplifier 7.

On the basis of the output thus given, the amplifier 7 generates, through calculations, an MO signal S5 consisting of difference signals and a sum signal S4 consisting of a sum of outputs of all the detectors. The amplifier 7 sends the generated MO signal S5 and the sum signal S4 to a read channel section 8. The sum signal S4 is a signal read out of an area (A in FIG. 1) in which data has preliminarily been written at a format time of the optical disc 6 and cannot be rewritten. Further, the MO signal S5 is a signal read out of a rewritable areas (B and C in FIG. 1).

The read channel section 8 extracts a sector mark signal S6 from the sum signal S4 and supplies it to the ODC 3. Using the sector mark signal S6 as standard, the ODC 3 sends a gate signal S7 to the read channel section 8. With the gate signal S7 sent from the ODC 3, the read channel section 8 outputs the sum signal S4 and the MO signal S5 while switching these signals. In other words, the sum signal S4 is output while an area which has the prebits is regenerated, whereas the MO signal S5 is output while a rewritable area is regenerated.

Further, the read channel section 8 generates a channel clock signal S8 and a synchronous regeneration signal S9 on the basis of VFO signals in the sum signal S4 and the MO signal S5, and sends these signals to the ODC 3.

On the basis of the given sector mark signal S6 and channel clock signal S8, the ODC 3 sends the gate signal S7 described above to the read channel section 8 and demodulates the synchronous regeneration signal S9 and sends it as a reproduced data signal S10 to the host computer 2. Thus, the optical disc system 1 is capable of recording data on the optical disc 6 and reproducing recorded data.

(2) Internal Configuration of ODC

The ODC 3 (FIG. 3) is configured to control a rotating speed of the optical disc 6 in recording and reproducing data on and from the optical disc 6, and modulate and demodulate data to be recorded and reproduced with RLL (1, 7) and NRZI.

Figure 4:
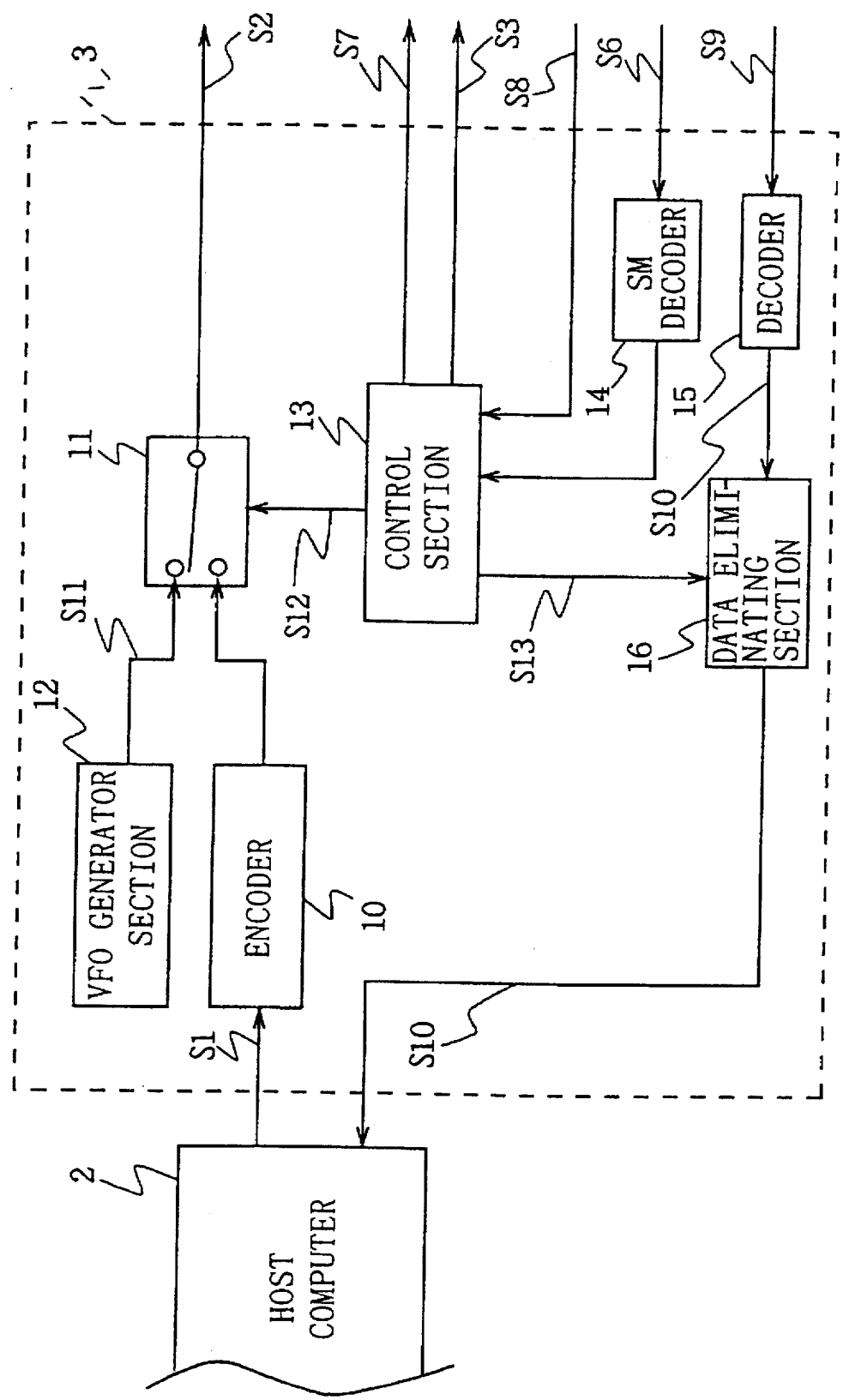
FIG. 4 is a block diagram showing an internal configuration of an ODC of the present invention.

As shown in FIG. 4 in which the members corresponding to those shown in FIG. 3 are represented by the same reference numerals, the ODC 3 inputs the data signal S1 given from the host computer 2 into an encoder 10. The encoder 10 modulates the data signal S1 with RLL(1,7) and NRZI, and sends the signal to a switch 11. A VFO signal S11 which is generated by a VFO signal generator section 12 is being sent to the switch 11.

Figure 5:
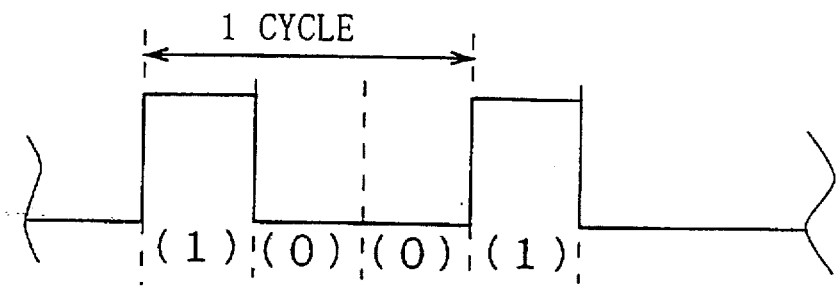
FIG. 5 is pattern diagram illustrating patterns of a VFO signal generated in the ODC.

The VFO signal generator section 12 is generating a VFO signal S11 which has a pattern shown in FIG. 5 and is irresistive of the encoding restrictive length determined by the modulation with the RLL(1,7) and NRZI by the encoder 10. In other words, the VFO signal S11 consists of patterns having a period shorter than that of the conventional VFO patterns modulated according to the encoding restrictive length (FIG. 2). Speaking concretely, the VFO signal S11 consists of repetitive patterns having a cycle composed of three bits. Conventionally, a cycle was composed of four bits.

The switch 11 inputs the VFO signal S11 thus generated and the modulated data signal S1 to terminals respectively.

The switch 11 sends out the VFO signal S11 and the data signal S1 as a recording data signal S2 while switching these signals. The switch 11 performs the signal switching with a switching signal S12 given from a control section 13.

The control section 13 inputs the sector mark signal S6 through a sector mark (SM) decoder 14 as well as the channel clock signal S8 given from the read channel section 8. On the basis of the sector mark signal S6 and the channel clock signal S8 obtained from the read channel section 8, the control section 13 generates the control signal S3, gate signal S7 and switching signal S12. These signals are generated by utilizing the sector marks which are recorded at heads of sectors on the optical disc 6.

Figure 1:
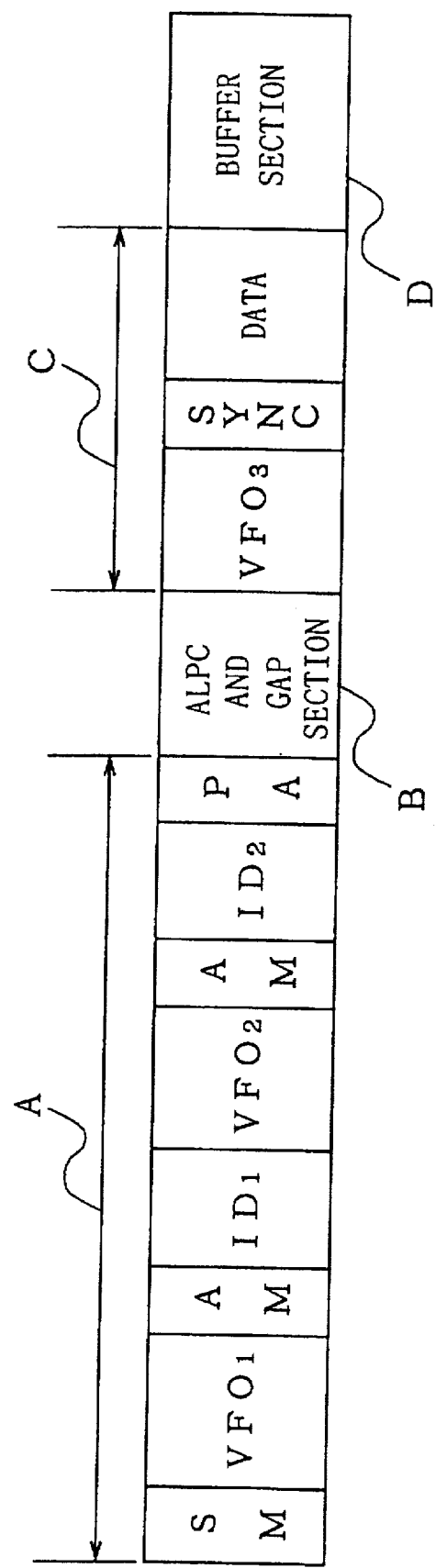
FIG. 1 is a configurational diagram showing an example of a sector format on a conventional magneto-optical disc.

Speaking concretely, with the channel clock signal S8, the number of cycles which have passed from a readout time of the sector mark signal S6 from the optical disc 6 is determined, so that a timing of switching between the sum signal S4 and the MO signal S5 is detected at a reproduction time, and the gate signal S7 is generated and sent out. At a recording time, a recorded location of the sector mark signal S6 on the optical disc 6 is detected to detect a recorded location of the VFO signal S11 taking the location of the sector mark signal S6 as standard, and the switching signal S12 is generated and sent out to change over the switch 11. The number of cycles which have passed after a standard time which is to be used as switching timing at the reproduction time and a recorded location of the VFO signal S11 to be judged on the basis of a standard location at the recording time are preliminarily set in the control section 13 on the basis of the sector format (FIG. 1).

Further, the ODC 3 inputs the synchronous reproduction signal S9 which is supplied at the reproduction time into a decoder 15. The decoder 15 demodulates the synchronous reproduction signal S9 with the RLL(1,7) and NRZI and gives this signal as a reproduced data signal S10 to a data eliminating section 16. The reproduced data signal S10 which is demodulated by the decoder 15 comprises a VFO signal S11 which is not necessary for data to be actually given to the host computer 2. Therefore, the data eliminating section 16 extracts and eliminates the VFO signal S11 from the reproduced data signal S10. The VFO signal S11 is eliminated by the data eliminating section 16 in correspondence to an elimination designation signal S13 given from the control section 13. When the VFO signal S11 is input into the data eliminating section 16, the control section 13 supplies the elimination designation signal S13 for allowing the data eliminating section 16 to eliminate the VFO signal S11 from the reproduced data signal S10. The reproduced data signal S10 from which the VFO signal S11 has been eliminated is thus sent from the ODC 3 to the host computer 2.

The ODC 3 performs encoding modulation of the input data signal S1, and generates the VFO signal S11 as described above, and outputs the recording data signal S2 by sending out the data signal S1 and the VFO signal S11 while changing over the switch 11 with the switching signal S12 generated on the basis of the sector mark signal S6 and the channel clock signal S8. Further, the ODC 3 generates and sends out the control signal S3 and the gate signal S7 on the basis of the sector mark signal S6 and the channel clock signal S8. Furthermore, the ODC 3 eliminates the VFO signal S11 from the reproduced data signal S10 obtained at the reproduction time and sends out the reproduced data signal S10 to the host computer 2. Thus, the ODC 3 sends out the recording data signal S2 consisting of the data signal S1 and the VFO signal S11, and supplies the reproduced data signal S10 from which the VFO signal S11 has been eliminated to the host computer 2.

(3) Internal Configuration of the Read Channel Section

Figure 6:
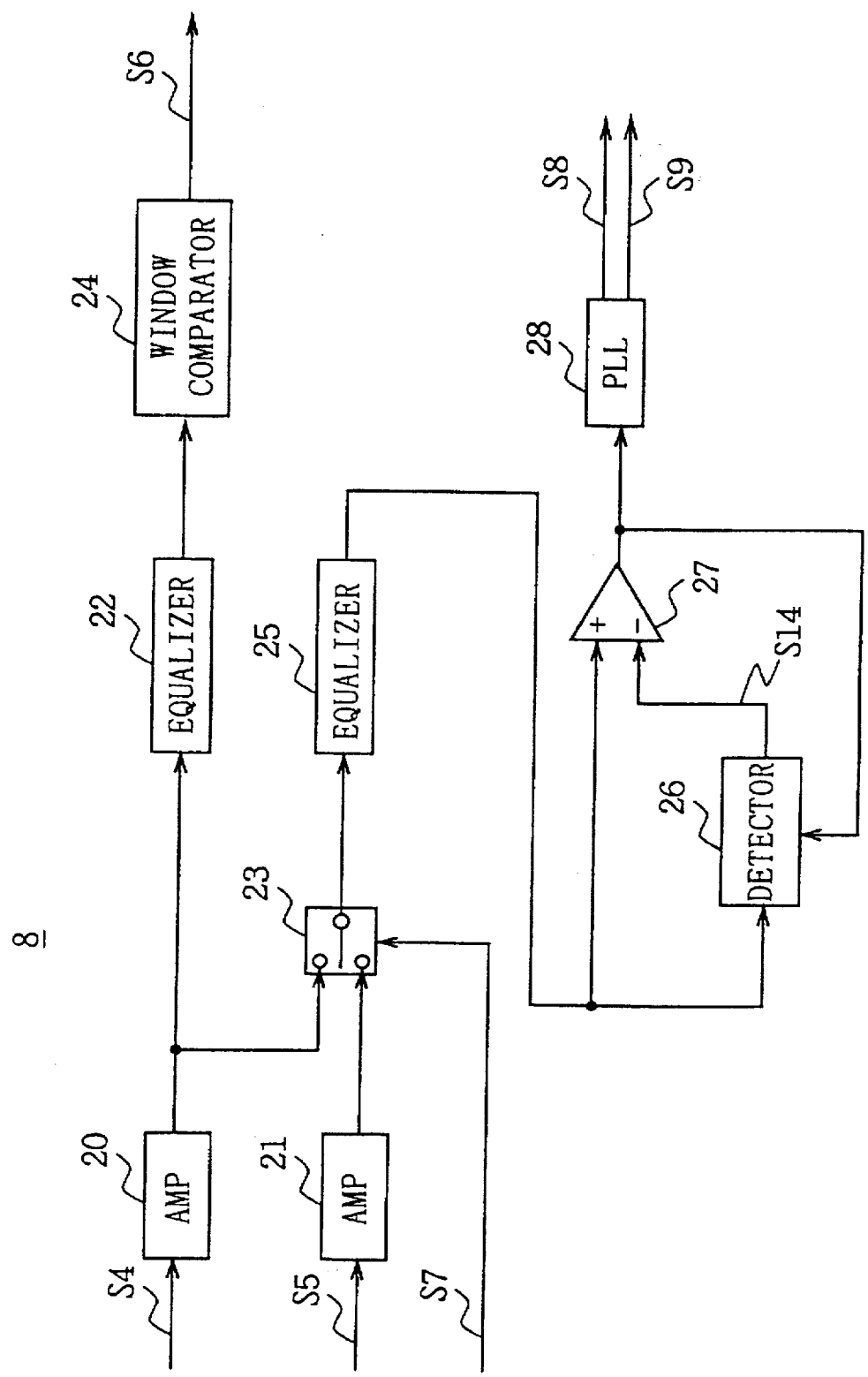
FIG. 6 is a block diagram showing an internal configuration of a read channel section.

In FIG. 6 wherein members corresponding to those shown in FIG. 3 are represented by the same reference numerals, a reference numeral 8 designates the read channel section as a whole which inputs the sum signal S4 or the MO signal S5 given from the amplifier 7 (FIG. 3) at a regeneration time to an amplifier 20 or an amplifier 21 respectively. The amplifier 20 amplifies the sum signal S4, and sends it to an equalizer 22 and a switch 23 respectively. The amplifier 21 amplifies the MO signal S5 and sends it to the switch 23.

The equalizer 22 eliminates noise components from the sum signal S4 and then gives it to a window comparator 24. The window comparator 24 sets a predetermined window and detects whether or not a plurality of data are coincident within the window, thereby extracting only a portion indicating the sector mark from the sum signal S4 and supplies the portion as the sector mark signal S6 to the ODC 3 (FIG. 3).

The switch 23 changes over a connection with the gate signal S7 given from the ODC 3 and sends the input sum signal S4 or MO signal S5 to an equalizer 25. The switch 23 is configured by ODC3 to be connected to a terminal into which the sum signal S4 is input when the sum signal S4 is reproduced or to a terminal into which the MO signal S5 is input when the MO signal S5 is reproduced. Accordingly, it is possible to send the sum signal S4 to the equalizer 25 in a period where an area which has the prebits is being reproduced and the MO signal S5 to the equalizer 25 in a period where a rewritable area is being reproduced.

The equalizer 25 eliminates noise components from the sum signal S4 or the MO signal S5, and sends the signal to a detector 26 and a comparator 27 respectively. The detector 26 detects a level variation of a signal waveform caused by the given sum signal S4 or MO signal S5 and generates a standard signal S14 to be used as a slice level for binary notation, and supplies it to the comparator 27. The comparator 27 denotes the sum signal S4 or MO signal S5 by binary digits using the standard signal S14 as a base and sends them to a phase locked loop (PLL) circuit 28. After the sum signal S4 or MO signal S5 designated by the binary digits are sent out, they are branched and given to the detector 26 as feedback signals.

Owing to use of the standard signal S14 which is generated in correspondence to level variations of the sum signal S4 or the MO signal S5, the sum signal S4 or the MO signal S5 can be denoted by a binary digit with the comparator 27 correctly, even when a signal level reproduced at the reproduction time of the optical disc 6 is varied due to noise or the like since a level of the standard signal S14 is varied simultaneously.

The PLL circuit 28 generates the synchronous reproduction signal S9 and the channel clock signal S8 by phase locking the sum signal S4 or the MO signal S5 which is denoted by a binary digit. The PLL circuit 28 sends the synchronous reproduction signal S9 thus produced together with the channel clock signal S8 to the ODC 3.

Thus, the read channel section 8 is configured to denote the sum signal S4 or the MO signal S5 obtained by reproducing the optical disc 6 by binary digits, and generate the channel clock signal S8 and the synchronous reproduction signal S9 with the binary digit.

(4) Operations

The optical disc system 1 which has the configuration described above is configured to generate, with a VFO signal generator section 12 provided in the ODC 3, VFO patterns which have a period composed of four bits when it is modulated with RLL(1,7) and NRZI according to a predetermined encoding restrictive length, as the VFO signal S11 having a pattern composed of three bits and record them on the optical disc 6.

The VFO has an object to generate the channel clock signal S8 at a readout time of data, thereby synchronizing the sum signal S4 and the MO signal S5 obtained by reproducing the optical disc 6 (FIG. 3) with the channel clock signal S8. Accordingly, the VFO need not always be according to a restrictive length for modulation with RLL (1,7) and NRZI, but may be composed of a predetermined pattern which is repeated at least in a certain number.

For this reason, the optical disc system 1 is capable of narrowing a VFO area by reducing the number of bits per period by generating the VFO signal S11 composed of patterns having a cycle "100" which is shorter than that of the conventional VFO signal composed of the four bits of "1100". Speaking concretely of an optical disc which has a surface composed of 1.3 Gbytes and a format of 1 Kbyte per sector, it is possible to reduce $VFO_1$ and $VFO_2$ of the address section A to 6 bytes and 4 bytes respectively, and reduce $VFO_3$ in the data section C to 6 bytes, thereby increasing a sector capacity of one surface by 13 Mbytes.

On the reduction of the number of bits per period of VFO, it is conceivable to further narrow a VFO area by reducing a bit portion composed of "00" between codes to a bit of "0" and use two bits as one cycle.

Figure 7:
FIGS. 7A and 7B are waveforms explaining interference between codes when one cycle is two bits in VFO.
Figure 7:
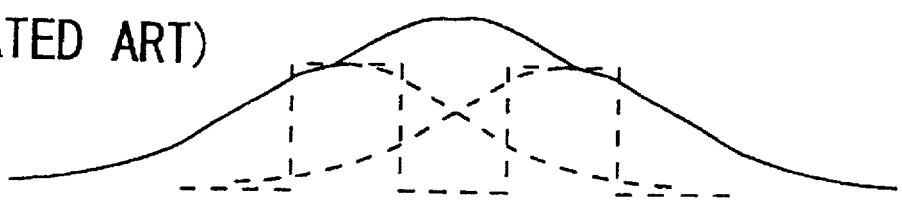

However, as represented by a signal B in FIG. 7A, a signal A recorded on an optical disc 6 is dulled at a stage of reproduction by a modulation transfer function (MTF) of an optical system. Accordingly, as shown in FIG. 7B, interference between the codes occurs when the bit space between the codes is narrowed. Though such interference between the codes can be encoded to binary data by using a reproduction technique such as partial response maximum likelihood (PRML), it is improper that the interference between the codes occurs in the VFO signal S11 which is used for generating the channel clock signal S8. It is therefore required to reserve a space in which the interference between the codes is sufficiently negligible between the codes in the VFO signal S11, or between a bit representing "1" and the next bit representing "1".

In case of an optical disc composed of write permit areas, a pit indicating neighboring bits may be connected to each other at write time under an influence due to thermal diffusion on the optical disc 6. For avoiding such connection, it is necessary to shorten a period of time for irradiation with laser or lower a laser power at the write time.

As understood from the foregoing description, it is not proper to reduce the bit portion composed of "00" to a bit of "0" between the codes and it can be said the VFO area has been narrowed at maximum by reducing the period composed of the four bits to the three bits.

The configuration described above makes it possible to narrow a VFO area in a sector format, thereby making it possible to obtain an optical disc system 1 which allows a user to use an increased data recording capacity on the optical disc 6 since the configuration allows VFO signal S11 composed of patterns having a period shorter than that of the patterns modulated according to the encoding restrictive length for modulation with RLL(1,7) and NRZI to be generated and recorded on the optical disc 6 by using the VFO signal generator section 12 in which patterns having a period shorter than that of the patterns modulated according to the encoding restrictive length for modulation with RLL (1,7) and NRZI are preliminarily recorded, the switch 11 which selects the data signal S1 modulated according to the encoding restrictive length for modulation with RLL(1,7) and NRZI or the VFO signal S11 generated by the VFO signal generator section 12, and the control section 13 which controls the switch 11 so that the VFO signal S11 is sent out when the VFO signal S11 is to be recorded on the optical disc 6 and the data signal S1 is sent out when the data signal S1 is to be recorded on the optical disc 6.

Though the embodiment has been described above as an optical disc system which is to be applied to the optical disc 6 having the sector format which has 1,024 bytes per sector, the present invention is not limited to this optical disc but is applicable also to other optical discs, for example, an optical disc composed of 512 bytes per sector, so far as the VFO signals are to be recorded in a sector format.

Though the data signal S1 given from the host computer 2 is modulated in the RLL(1,7)+NRZI mode in the embodiment described above, the present invention is not limited to this modulation mode, but is applicable also to other optical disc systems, for example, an optical disc system which uses modulation with RLL(2,7), so far as data is to be recorded in a sector format having VFO areas.

According to the foregoing description, the present invention makes it possible to narrow recording areas for synchronization control data in the sector format, thereby enabling to obtain an optical disc system, an optical disc and a recording method which allow users to use increased data recording capacities on recording media by disposing, in an optical disc system in which recording data modulated according to a predetermined encoding restrictive length is recorded on an optical disc, switching means for outputting synchronization control data which is composed of patterns having a period shorter than the encoding restrictive length and used for synchronization at data readout time or recording data selectively in predetermined time cycles so that the synchronization control data is generated and recorded on a medium as patterns having a period shorter than that of the patterns obtained by modulating synchronization control data according to a predetermined encoding restrictive length.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical disc system for recording, on an optical disc, recording data modulated according to a predetermined encoding restrictive length, said optical disc system comprising:

switching means for selectively outputting, at predetermined time intervals, synchronization control data which comprises of patterns having a period shorter than said encoding restrictive length and is used for synchronization during readout said data from said optical disc or said recording data; and an optical pickup for recording output signals from said switching means on said optical disc.

2. The optical disc system according to claim 1, further comprising:

synchronization control data storage means in which the patterns of said synchronization control data are preliminarily recorded; and modulator means for modulating user data according to said predetermined encoding restrictive length and outputting it as recording data.

3. An optical disc wherein:

recording data modulated at a predetermined encoding restrictive length, and synchronization control data, which comprises of patterns having a predetermined period and is used for synchronization during readout said recording data, are recorded; and said synchronization control data comprises of patterns having a period shorter than said predetermined encoding restrictive length.

4. The optical disc according to claim 3 wherein at least said synchronization control data is recorded as prepits.

5. The optical disc according to claim 3 wherein said synchronization control data is binary data which is set low for a period of time longer than a period of time for which the data is set high.

6. A recording method for recording, on an optical disc, recording data which is modulated according to a predetermined encoding restrictive length, comprising the steps of:

generating synchronization control data which comprises of patterns having a period shorter than said encoding restrictive length and is used for synchronization during readout said data from said optical disc; and outputting said recording data or said synchronization control data selectively at predetermined time intervals to an optical pickup to thereby recording output signals provided to said optical pickup on said optical disc.

* * * * *